(12) United States Patent
Schmidt et al.

(10) Patent No.: US 6,413,003 B1
(45) Date of Patent: Jul. 2, 2002

(54) COMPLIANT PIVOT SOCKET FOR AUTOMOTIVE STEERING

(75) Inventors: George R. Schmidt, St. Louis; Glen C. Parker, St. Peters; Roger Sellers, Arnold, all of MO (US); June M. Jeffries, Troy, IL (US)

(73) Assignee: Federal-Mogul Worle Wide, Inc., Southfield, MI (US)

( * ) Notice: Subject to any disclaimer, the term of this patent is extended or adjusted under 35 U.S.C. 154(b) by 0 days.

(21) Appl. No.: 09/566,288

(22) Filed: May 5, 2000

Related U.S. Application Data (60) Provisional application No. 60/138,100, filed on May 25, 1999.

(51) Int. Cl.$^7$ ................................................ F16C 11/06
(52) U.S. Cl. ........................ 403/120; 403/135; 403/133; 403/144
(58) Field of Search ................................ 403/120, 122, 403/137, 135, 132, 133, 144, 145, 146

(56) References Cited

U.S. PATENT DOCUMENTS

| | | | | |
|---|---|---|---|---|
| 2,846,251 A | * | 8/1958 | Herbenar | 403/62 |
| 3,041,094 A | * | 6/1962 | Herbenar | 403/132 X |
| 3,408,124 A | * | 10/1968 | Melton et al. | 403/131 X |
| 3,790,195 A | * | 2/1974 | Herbenar | 403/124 |
| 3,945,737 A | * | 3/1976 | Herbenar | 403/132 X |
| 4,007,924 A | * | 2/1977 | Jorn et al. | 403/228 X |
| 4,076,434 A | * | 2/1978 | Sperner | 403/224 |
| 5,028,163 A | * | 7/1991 | Krieg et al. | 403/131 |
| 5,509,749 A | * | 4/1996 | Eifert et al. | 403/144 |
| 5,529,420 A | * | 6/1996 | Henkel et al. | 403/135 |
| 5,597,258 A | | 1/1997 | Kincaid et al. | 403/144 |

* cited by examiner

Primary Examiner—Harry C. Kim
Assistant Examiner—John R. Cottingham
(74) Attorney, Agent, or Firm—Polster, Lieder, Woodruff & Lucchesi LC (57) ABSTRACT

A pivot socket of the present invention incorporates a stud shaft component having a partially spherical head portion disposed within a housing cavity, and an axial pin extension extending upward into the cavity therefrom. The partially spherical head portion seats against a partial spherical bearing surface disposed within the housing cavity, and the axial pin extension is enclosed within a resilient cushion. During use, lateral and axial loads imparted on the stud shaft are transformed into radial and axial component forces at the bearing surfaces. The radial force components are distributed to the interior walls of the housing cavity, while the axial force components are transferred axially through the resilient cushion to the end closure components secured to the housing. Little or no lateral force components are transferred to the resilient cushion from lateral loads imparted on the stud shaft, thereby reducing wear on the pivot socket components and extending the useful life thereof.

4 Claims, 8 Drawing Sheets

COMPLIANT PIVOT SOCKET FOR AUTOMOTIVE STEERING

CROSS-REFERENCE TO RELATED APPLICATIONS

U.S. Provision Patent Application No. 60/138,100 filed May 25, 1999 from which priority is claimed.

STATEMENT REGARDING FEDERALLY SPONSORED RESEARCH OR DEVELOPMENT

Not Applicable.

BACKGROUND OF THE INVENTION

This invention relates to the design of movable sockets, for example, ball joints as used in automotive steering and suspension systems, and more particularly, to a movable socket configured with a spherical or part-spherical bearing surface and a projecting pin stud restrained within an elastomeric or spring-centered compliance bearing. The movable socket of the present invention is additionally configured to have increased durability under conditions of high load and misalignment and to be assembled using conventional techniques. While the present invention is described in detail with respect to automotive applications, those skilled in the art will recognize the broader applicability of the invention.

Conventional ball joints, and other movable sockets are used, for example, in automotive steering and suspension applications. The sockets comprise a housing having a circular cylindrical internal surface, a ball stud with a part-spherical ball head contained in the housing, and a synthetic resin or sintered alloy bearing member supporting the ball head within the housing. These components are commonly installed into the housing through a posterior opening, with the ball stud extending outward through an axially disposed anterior opening of a smaller diameter than the ball head. Traditionally, the posterior opening is closed by means of a cover-plate, spun, swaged, or welded in place. Once secured in place, the cover-plate presses on the bearing member either directly or indirectly through a resilient rubber intermediate component.

Several ball joint designs incorporating a projecting pin from the upper surface of the ball stud are shown in the prior art. These designs are intended to limit angular movement of the stud relative to the housing in which it is contained.

U.S. Pat. No. 3,790,195 issued to Edward J. Herbenar on Feb. 5, 1974 discloses a preloaded socket joint for an automotive steering linkage. The '195 socket joint is primarily for rotational movement with a stud projecting from an internal cavity housing and having a part-spherical bulged section received in the housing and seated against a spherical face seat adjacent the projecting point of the stud from the housing. The stud further includes an axial extension beyond the half sphere within the housing which is received in a bearing with a resilient member entrapped between the wall of the cavity and the bushing. The opposite end of the housing cavity from the point of projection is closed by a cap which applies a preload to the axial end of the stud within the cavity and to the resilient member. As can be seen in FIG. 1 of the '195 patent, all axial loads on the stud are transferred either directly through the stud itself to the cap which closes the housing, or through the bushing and resilient member to the cap.

U.S. Pat. No. 3,945,737 issued on Mar. 23, 1976, also to Edward J. Herbenar discloses a modification of the socket joint shown in the '195 patent. The '737 pivot joint provides a housing with a part-spherical bearing seat at one end thereof, a recessed closure cap secured in the other end thereof, and a stud having a shank projecting freely into the housing with a head tiltable on the seat. The stud further includes a tapered pin depending from the head and bottomed directly on the closure plate together with an axially split rubber bushing surrounding the pin and snugly seated in the housing. A wear take-up member between the closure plate and the bushing urges the bushing toward the head of the stud, and a ring surrounding the recess of the closure plate limits the tilting of the stud on the bearing seat. In this design, the compressive loads of the stud and the angulation loads of the stud are taken by the same member, i.e. the axially split, resilient bushing with a tapered bore. Thus, the design inhibits freedom in selecting an axial preload independently of angulation considerations and vice-versa.

U.S. Pat. No. 5,597,258 issued to Kincaid et al. on Jan. 28, 1997 discloses a preloaded pivot joint with a stud capable of rotation and angulation. The preloaded pivot joint is designed such that different internal components transfer the respective lateral loads, axial compression loads, and angulation loads experienced by the stud. Specifically, as seen in FIG. 1 of the '258 patent, the stud incorporates a hemi-spherical portion for transferring lateral loads to a fixed bearing seat within the stud housing, a concentric convex tip for transferring compressive (axial) loads directly to a spring biased bearing seat, and a cylindrical extension between the hemi-spherical portion and the convex tip for radially transferring angulation loads to a hardened cylindrical metal ring of a resilient composite bushing.

Each of these prior art pivot sockets includes compliance components formed of a resilient material such as rubber, polyurethane, and the like, which surrounds a projection pin portion of the stud and which transfers some form of loading from the stud to the housing. Accordingly, it is highly advantageous to develop a preloaded pivot joint wherein a single compliance component transfers both axial and angulation loads to either the hardened housing walls or the end closure components, limiting the movement of the stud, but which does not carry lateral loads, reducing wear on the pivot socket components and extending the useful life thereof and which provides freedom in selecting an axial preload independently of stud angulation considerations.

BRIEF SUMMARY OF THE INVENTION

Among the several objects and advantages of the present invention are:

The provision of a pivot socket employing a lower partially-spherical bearing surface to seat a stud having an axial extension within a housing cavity, and further employing a resilient component to surround the axial extension and to transfer axial load components from the bearing surfaces to end closure components;

The provision of the aforementioned pivot socket wherein the resilient component experiences little or no direct radial force when lateral forces are imparted to the stud;

The provision of the aforementioned pivot socket wherein the stud includes a partially spherical portion configured to seat against the lower partial spherical bearing surface;

The provision of the aforementioned pivot socket wherein the lower partial spherical bearing surface transfers lateral loads radially and axially from the partially spherical stud portion to the housing;

The provision of the aforementioned pivot socket wherein a preload component transfers axial loads stud portion axially to the resilient component surrounding the axial extension of the stud;

The provision of the aforementioned pivot socket wherein the resilient component surrounding the axial extension of the stud extends from the end closure components to adjacent an upper surface of the preload component;

The provision of the aforementioned pivot socket wherein a preload component is interposed between the resilient component and the upper surface of the partially spherical stud portion;

The provision of the aforementioned pivot socket wherein the resilient component acts alone to provide both the axial preload between an upper spherical bearing and the lower partially spherical bearing, as well as providing resistance to angular displacement of the stud member; and The provision of the aforementioned pivot socket wherein the configuration of the resilient component permits assembly of the pivot socket using conventional methods.

Briefly stated, a pivot socket of the present invention incorporates a stud shaft component having a part-spherical head portion disposed within a housing cavity, and an axial pin extension extending upward into the housing cavity. The part-spherical head portion is seated against a lower partial spherical bearing surface disposed within the housing cavity, and the axial pin extension is enclosed within a resilient cushion. During use, lateral or axial loads imparted on the stud shaft are transformed into radial and axial component forces at the bearing surface. The radial force components are transferred primarily to the interior walls of the housing cavity, while the axial force components are transferred axially through the resilient cushion to the end closure components secured to the housing. Little or no radial force components are transferred to the resilient cushion from lateral or axial loads imparted on the stud shaft, reducing wear on the pivot socket components and extending the useful life thereof.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believe to be the best mode of carrying out the invention.

Figure 1:
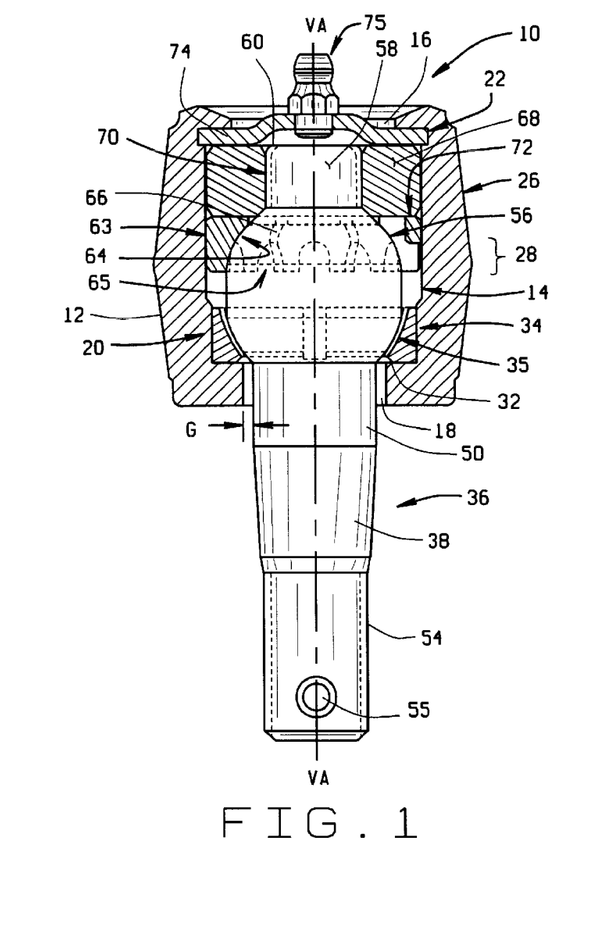
FIG. 1 is a sectional view of an embodiment of a preloaded pivot socket of the present invention, illustrating an elastomeric cushion resilient member.

Turning to FIG. 1, a first embodiment of the pivot joint of the present invention is shown generally at 10. The pivot joint includes a housing 12, within which the various internal components of the pivot joint are enclosed. Housing 12 is generally cylindrical, with a central bore 14 of non-uniform radius having a posterior opening 16 and an anterior opening 18. The radius of central bore 14 decreases to define a reduced diameter portion 20 at the base of the housing, adjacent anterior opening 18. A circumferential groove 22 is formed in bore 14, adjacent the posterior opening 16. The exterior surface 26 of housing 12 may follow the general contour of the central bore 14. In the embodiment illustrated, the surface 26 has an expanded ridge 28 formed in it. The ridge 28 is used for attachment of pivot joint 10 to other components (not shown). As may be appreciated, the ridge 28 also may be adapted for other specific kinds of installations employing threads or other connectors (not shown).

To assemble ball joint 10, a lower bearing 30 sized to fit within central bore 14 is seated within housing 12. The lower bearing 30 includes a central bore 32 axially aligned with a vertical axis VA of the housing, and an outer surface 34 of bearing 30 is designed to correspond to the surface 20 in housing 12. The inner surface 35 of the lower bearing 30 is formed in a partially spherical shape to receive a stud 36, and may include one or more crenellations or breaks 37 to facilitate expansion and contraction.

Stud 36 has a generally cylindrical body 38 and an enlarged spherical ball or head portion 40. To assembly the pivot joint the lower end of the cylindrical body 38 is passed through central bores 32 and 14, such that the lower part-spherical surface 42 of the head portion 40 rests on an inner part-spherical surface 35 of lower bearing 30 seated within housing 12. The body 38 may include a uniform diameter upper portion 50 adjacent head portion 40, a tapered central portion 52, and a lower portion 54 of a narrow uniform diameter. A passage 55 through the lower portion 54 allows for the connection of additional components (not shown) thereto. The upper portion 50 is sized to fit within the central bore 32 of bearing 30, with the central portion 52 and lower portion 54 extending through the anterior opening 18, externally of housing 12. It will be noted that there is a gap G of predetermined width between the anterior opening 18 and the upper portion 50. This gap G or clearance permits conical and rotational movement of head portion 40 with respect to housing 12 with a predetermined limited range of movement.

Head portion 40 of the stud 36 additionally includes an upper part-spherical surface 56 having the substantially same radial dimensions as the lower part-spherical surface 42. When assembled, the upper part-spherical surface 56 and the lower part-spherical surface 42 define a generally spherical bearing unit within housing 12 which permits the aforesaid conical movement of the stud 36.

Projecting axially upward from the upper part-spherical surface 56 of stud 36 is a cylindrical axial extension or pin portion 58 coaxial with stud 36 and having a diameter approximately equivalent to that of the upper portion 50 of stud 36. The length of the pin portion 58 is selected such that the face 60 of the pin portion is disposed below the circumferential groove 22 in the housing 12. Those skilled in the art will readily recognize that the numerous size configurations for the stud 36, the head portion 40, and the pin portion 58 are possible, and will depend upon the particular application for which the pivot joint is utilized.

Once the lower part-spherical surface 42 of ball portion 40 is seated against the inner surface 35 of the lower bearing 30, an upper bearing 62 having an outer surface 63 sized to fit within the central bore 14 and an inner part-spherical bearing surface 64 conforming to the upper part-spherical surface 56 of the head portion 40 is seated against within the housing 12, against the upper part-spherical surface 56. The upper bearing 62 may include a number of reseted portions 65 and slits 66 for lubrication and to allow for contraction and expansion within the central bore 14, so as to conform tightly against the surface 56.

In the embodiment shown in FIG. 1, a shaped elastomeric cushion 68 having a central bore 70 sized to fit around the pin portion 58 of the stud 36 is seated against an upper face 72 of the upper bearing 62. The elastomeric cushion 68 may be isolated from the pin portion by means of a steel sleeve (not shown). The outer diameter of the elastomeric cushion 68 is sized to fit within the central bore 14, contacting the housing 12 and to extend slightly above the circumferential groove 22. To enclose the installed components within the housing, and to apply a predetermined preload pressure to the upper bearing 62 and lower bearing 30, an end closure cap 74 is installed within the circumferential groove 22 to close the posterior opening 16, partially compressing the elastomeric cushion 68. The end closure cap 74 may be retained within the circumferential groove 22 by any conventional means such as welding, spinning, or swaging of the housing 12, and may contain an axially disposed grease fitting 75. The compression of the elastomeric cushion 68 provides a resilient preload force downward from the end closure cap 74 and onto the upper face 72 of the upper bearing 62. The upper bearing 62 transfers a portion of the preload force onto the head portion 40 of the stud 40 which, in turn, transfers the force axially to the lower bearing 30 and to the housing 12. This preload force takes up any dimensional slop in the manner in which ball 40 is socketed in the bearings 30 and 62.

In this configuration, when a lateral force is applied to the portions of the stud 36 which projects from housing 12, the force is transferred radially into the lower bearing 30 and upper bearing 62. Due to the part-spherical curvature of the inner surfaces of these bearings, and the partially spherical configuration of the head or ball portion 40 of stud 36, a portion of the radially transferred force is directed outward against the housing 12, and a portion of the force is directed axially upward through the bearing 62 and axially downward through the bearing 30. The axially downward force is received in the lower portions of the housing 12 against which the bearing 30 is seated. The upper bearing 62 is not restrained against axial upward movement by any portion of the housing 12. Hence, if unimpeded, the upper bearing 62 would move axially upward in response to a lateral force on the stud 36. However, the elastomeric cushion 68 is interposed between the end closure cap 74 and the upper face 72 of the upper bearing 62. Correspondingly, the component of the lateral force on the stud 36 which is directed radially upward through the upper bearing 62 is transferred through the elastomeric cushion 68 to the end closure cap 74 and the housing 12.

In the event a direct axial load is applied to stud 36, it will similarly be transferred though the upper bearing 62 to housing 12 and to elastomeric cushion 68 and end closure cap 74. Only when angulation loads are applied to stud 36, resulting in a rocking movement of the head portion 40 about a central pivot point will cause elastomeric cushion 68 to experience radial forces transmitted through pin portion 58. By isolating elastomeric cushion 68 from radial forces due to axial and lateral loads on stud 36, the wear on cushion 68 is reduced.

Figure 2:
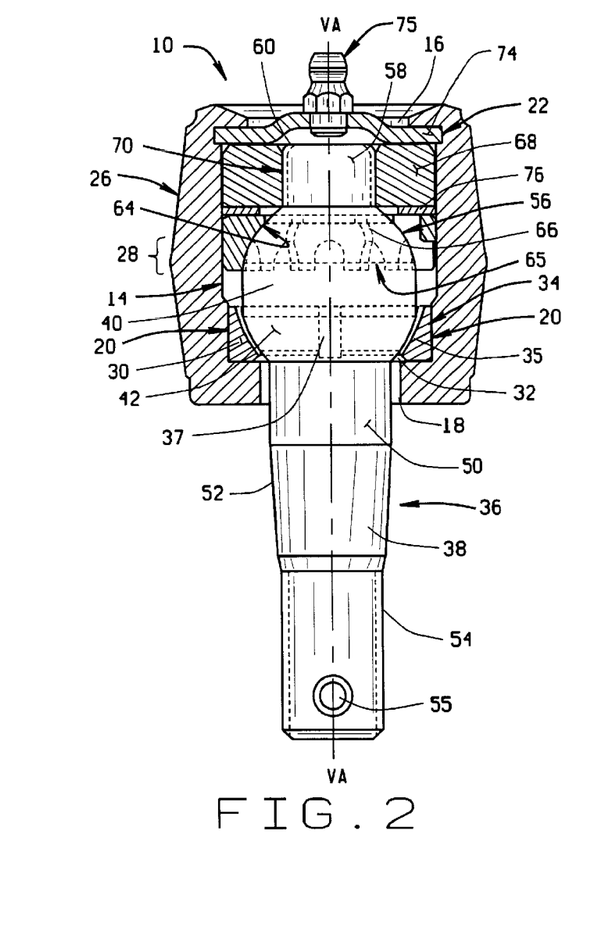
FIG. 2 is a section view of an alternate embodiment of the preloaded pivot socket of the present invention, illustrating an elastomeric cushion resilient member and Belleville washer preload configuration.

In a first alternate embodiment of the pivot joint of the present invention, shown in FIG. 2, a Belleville washer 76 is interposed between elastomeric cushion 68 and upper face 72 of upper bearing 62. Prior to the closure of central bore 14 by end closure cap 74, Belleville washer 76 is in a slightly conical configuration. The preload compression force applied through elastomeric cushion 68 by end closure cap 74 when it is seated within circumferential groove 22 to close posterior opening 16 deforms the Belleville washer to a substantially planar configuration, increasing the amount of preload force applied to the components within housing 12.

Figure 3:
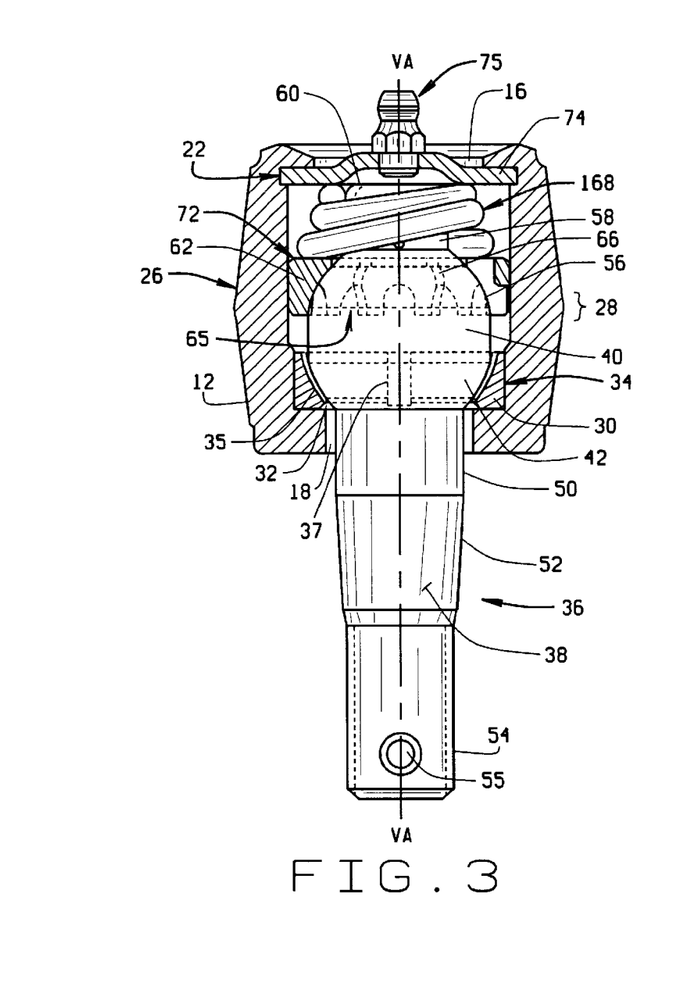
FIG. 3 is a section view of an alternate embodiment of the preloaded pivot socket of the present invention, illustrating a conical spring resilient member.

Turning to FIG. 3, a second alternate configuration of the pivot joint of the present invention is shown, in which elastomeric cushion 68 is replaced by a conical compression spring 168. Conical compression spring 168 is wound such that the lower portion of spring 168 seated on upper face 72 of upper bearing 68 is disposed apart from pin projection 58, and seated within a recessed channel or groove (not shown) to prevent radial motion. Alternatively, the lower portion of spring 168 contacting upper face 72 may be wound so as to additionally contact housing 12. Conversely, the upper portion of conical compression spring 168 is wound in a smaller diameter, to simultaneously contact end closure cap 74 and pin portion 58 adjacent face 60.

During installation, when conical compression spring 168 is enclosed between end closure cap 74 and upper face 72 of upper bearing 62, it is compressed to provide a preload force on upper bearing 62, lower bearing 30, and stud 36. As with elastomeric cushion 68, the conical compression spring is configured to transfer axial loads resulting from axial or lateral forces on stud 36 upward to end closure cap 74 from upper bearing 62. The upper portion of the spring 168 in contact with the pin portion 58 of stud 36 resists radial forces resulting from any angulation forces on stud 36. Those skilled in the art will recognize that a variety of conical compression springs may be employed within the scope of the present invention. For example, the number of coils in the spring, the thickness of the coils, and the expansive force of the spring may be varied depending upon the particular application for which pivot joint 10 is designed. Alternatively, the shape of compression spring 168 may be that of an hourglass, such that the constricted portion of compression spring 168 contacts the surface of pin portion 58 approximately midway between head portion 40 and face 60, while the upper coils of compression spring 168 are in contact with inner bore 14 of housing 12 and end closure cap 74, adjacent circumferential groove 22. Such an hourglass configuration may be composed of a pair of conical springs, positioned about pin portion 40 with one spring inverted relative to the other.

Figure 4:
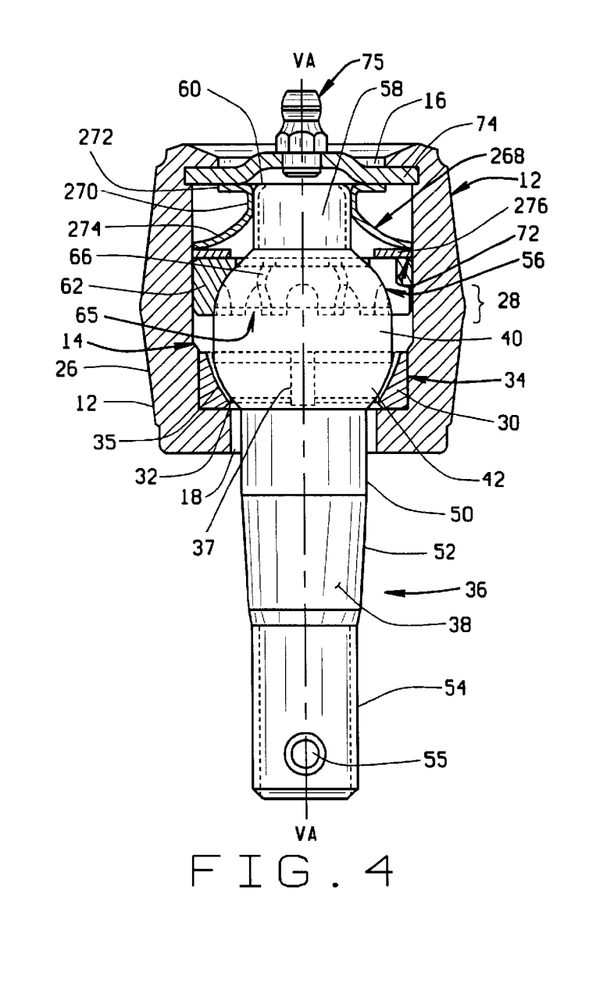
FIG. 4 is a section view of an alternate embodiment of the preloaded pivot socket of the present invention, illustrating a spring steel resilient member and Belleville washer preload configuration.

Turning to FIG. 4, a third alternate embodiment of pivot joint of the present invention is shown wherein conical compression spring 168 is replaced with a flared tube 268 formed from spring-steel. Flared tube 268 is formed with an upper cylindrical portion 270 having a diameter sized to contact the surface of pin portion 58 adjacent end closure cap 74. A circumferential flange 272 extends radially outward from portion 270 to seat against the surface of end closure cap 74. Lower portion 274 of flared tube 268 is flared outward in a radially increasing manner to seat against housing 12. In a relaxed state, prior to the installation of end closure cap 74 in circumferential groove 22, flared tube 268 has an overall length slightly greater than the distance between upper surface 72 of upper bearing 62 and circumferential groove 22. Seating end closure cap 74 in circumferential groove 22 compresses flared tube 268 against upper face 72 of upper bearing 62, causing lower portion 274 to flex and exert a preload force on upper bearing 62, lower bearing 30, and stud 36. To further increase the preload force and to provide for an even distribution of axial forces between upper face 72 of upper bearing 62 and flared tube 268, a Belleville washer 276 may be interposed between lower portion 274 and upper face 72. The preload forces exerted by the installation of end closure cap 74 into circumferential groove 22 additionally result in a deformation of Belleville washer 276.

As with elastomeric cushion 68, flared tube 268 is configured to transfer axial loads resulting from axial or lateral forces on stud 36 upward to end closure cap 74 from upper bearing 62. Upper portion 270 of flared tube 268 in contact with pin portion 58 of stud 36 resists radial orces resulting from any angulation forces on the stud 36. Those skilled in the art will recognized that a variety of flared tubes 268 may be employed within the scope of the present invention. For example, the thickness of the tube, and the expansive force of the flare material may be varied depending upon the particular application for which pivot joint 10 is designed. Alternatively, the shape of flared tube 268 may be that of an hourglass, such that a constricted portion (not shown) of flared tube 268 contacts the surface of pin portion 58 approximately midway between head portion 40 and face 60, while the upper portion is contact with housing 12 and end closure cap 74, adjacent circumferential groove 22.

Figure 5:
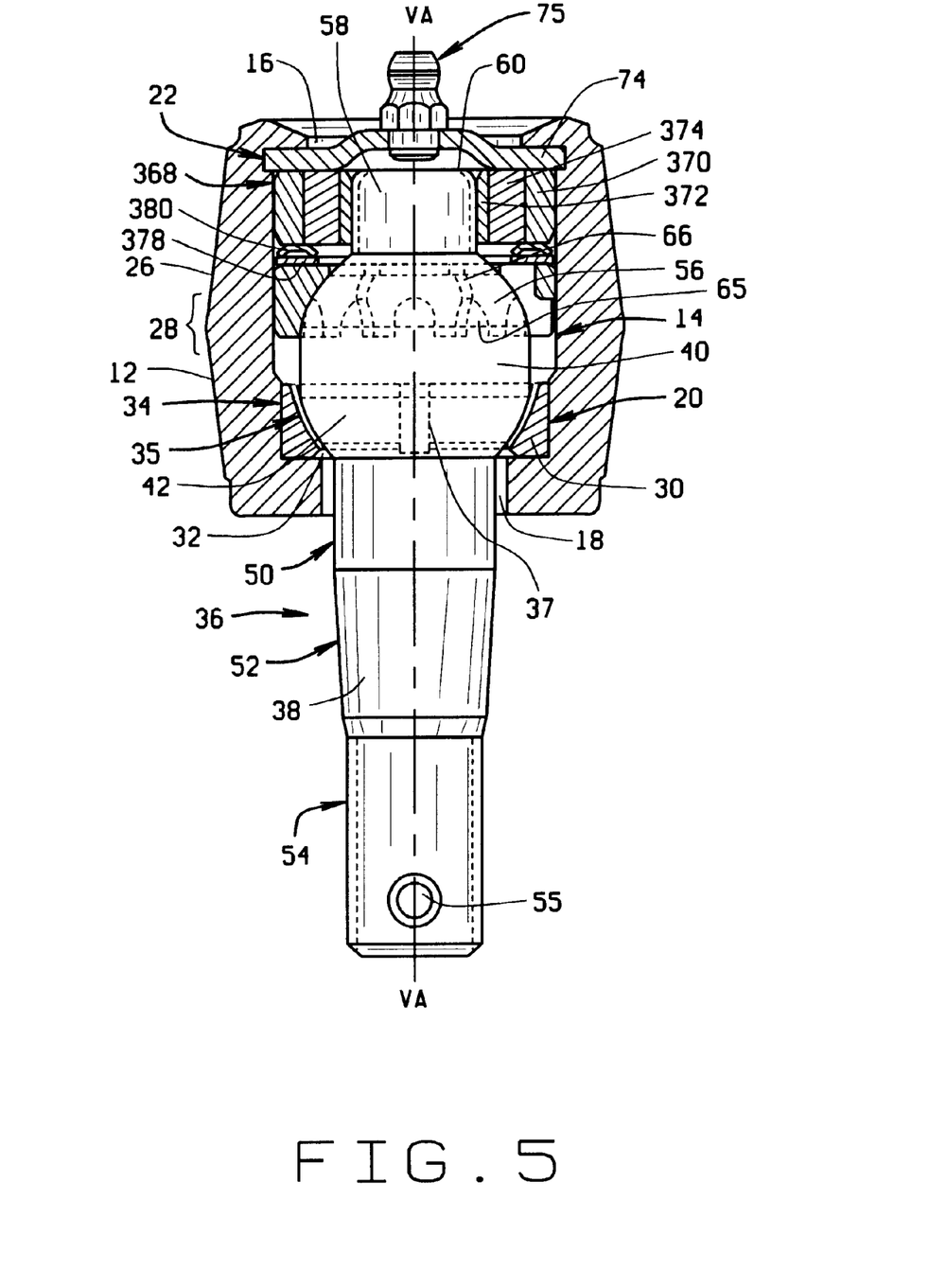
FIG. 5 is a section view of an alternate embodiment of the preloaded pivot socket of the present invention, illustrating an elastomeric compliance bearing resilient member.
Figure 6:
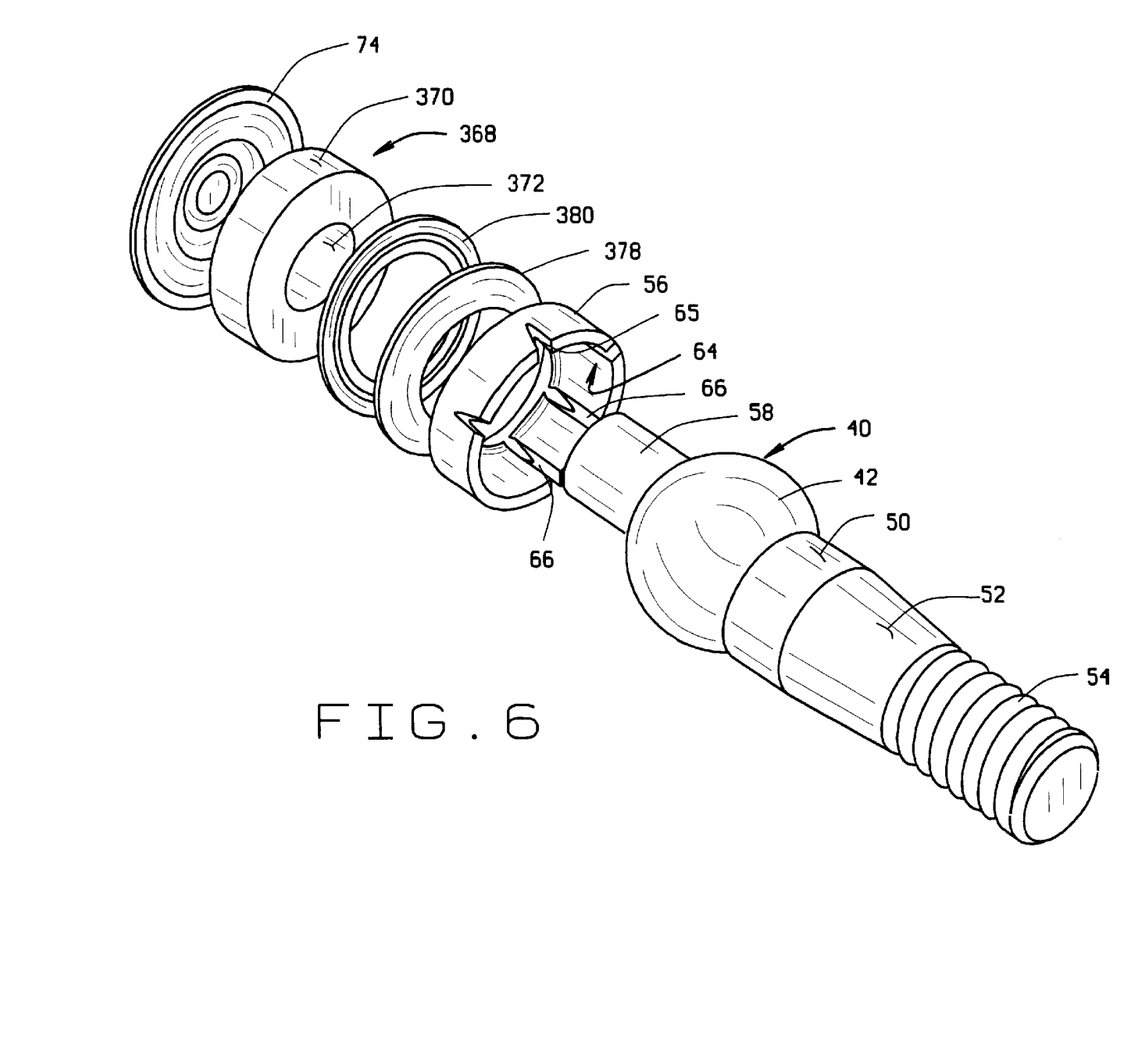
FIG. 6 is a perspective exploded view of the preloaded pivot socket of FIG. 5.

Turning to FIGS. 5 and 6, a fourth alternate embodiment of pivot joint of the present invention is illustrated wherein elastomeric cushion 68 is replaced with an elastomeric compliance bearing 368. Elastomeric compliance bearing 368 is composed of an outer metal ring 370 in contact with housing 12, an inner bearing sleeve 372 sized to fit around pin portion 58, and an intermediate ring 374 of elastomeric material disposed between outer ring 370 and sleeve 372.

Seated between elastomeric compliance bearing 368 and upper face 72 of upper bearing 62 is a Belleville washer 378 and a telescoping ring 380. During installation, Belleville washer 378 is seated against upper face 72 of upper bearing 62. Next, telescoping ring 380 is placed on Belleville washer 378, and elastomeric compliance bearing 368 seated thereon. Finally, end closure cap 74 is installed within circumferential groove 22. The installation of end closure cap 74 deforms Belleville washer 378 and crushes portions of telescoping ring 380, such that the Belleville washer exerts a preload force on upper bearing 62, stud 36, and lower bearing 30.

As with elastomeric cushion 68, elastomeric compliance bearing 368 is configured to transfer axial loads resulting from axial or lateral forces on stud 36 upward to end closure cap 74 from upper bearing 62. These axial loads are transferred from upper bearing 62 through Belleville washer 378 and crushed telescoping ring 380 to outer metal ring 370 of the elastomeric compliance bearing and to end close cap 74. Inner bearing sleeve 372 in contact with pin portion 58 of stud 36, and elastomeric intermediate ring 374 resists any radial forces resulting from angulation forces on stud 36. Those skilled in the art will recognize that a variety of materials may be utilized to form elastomeric compliance bearing 368 within the scope of the present invention. For example, the thickness of outer ring 370 and inner sleeve 372 may be varied depending upon the particular application for which pivot joint 10 is designed. Alternatively, inner sleeve 372 may be eliminated, and the properties of elastomeric intermediate ring 374 varied to absorb radial forces directly from pin portion 58.

Figure 7:
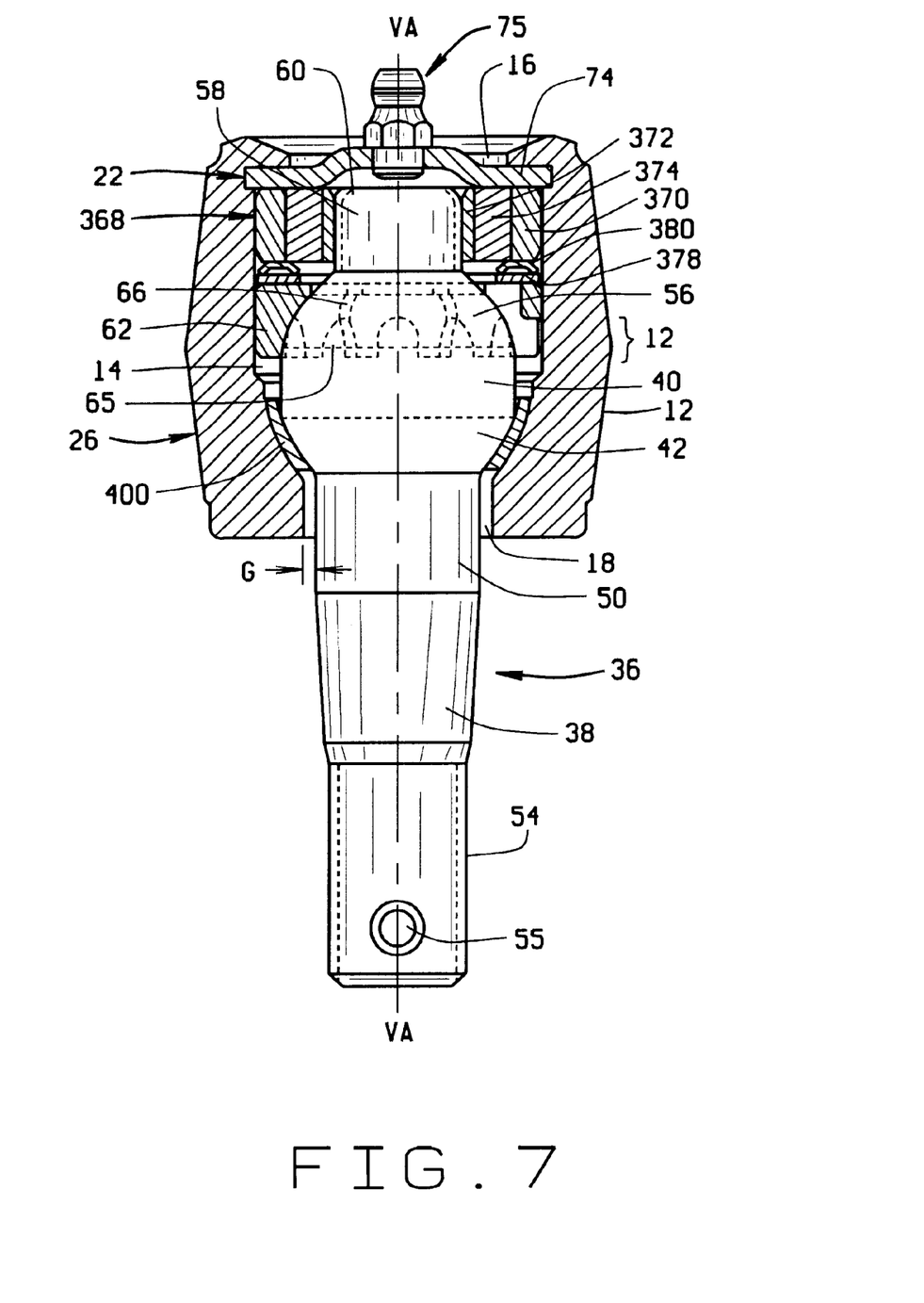
FIG. 7 is a section view of an alternate embodiment of the preloaded pivot socket of the present invention, illustrating an elastomeric compliance bearing resilient member and slipper sleeve.

Turning next to FIG. 7, a fifth alternate embodiment of the present invention pivot joint is shown wherein lower bearing 30 is replaced with a slipper sleeve 400. Although shown in the context of the embodiment of FIG. 6, slipper sleeve 400 illustrated in FIG. 7 will readily be understood by one skilled in the art of pivot joint design to be usable with each embodiment disclosed herein. Utilizing slipper sleeve 400 in place of lower bearing 30 permits the pivot point of stud 36 to sit lower in housing 12, such that a lower profile socket can be utilized.

FIGS. 8A through 10 illustrate alternate embodiments of the present invention pivot joint wherein upper bearing 62 and upper part-spherical surface 56 are eliminated, and the cylindrical axial extension or pin portion 58 is elongated. In place of upper part-spherical surface 56, a flat radial upper surface 402 directly receives Belleville washer 378 and a first flat washer 380.

Figure 8A:
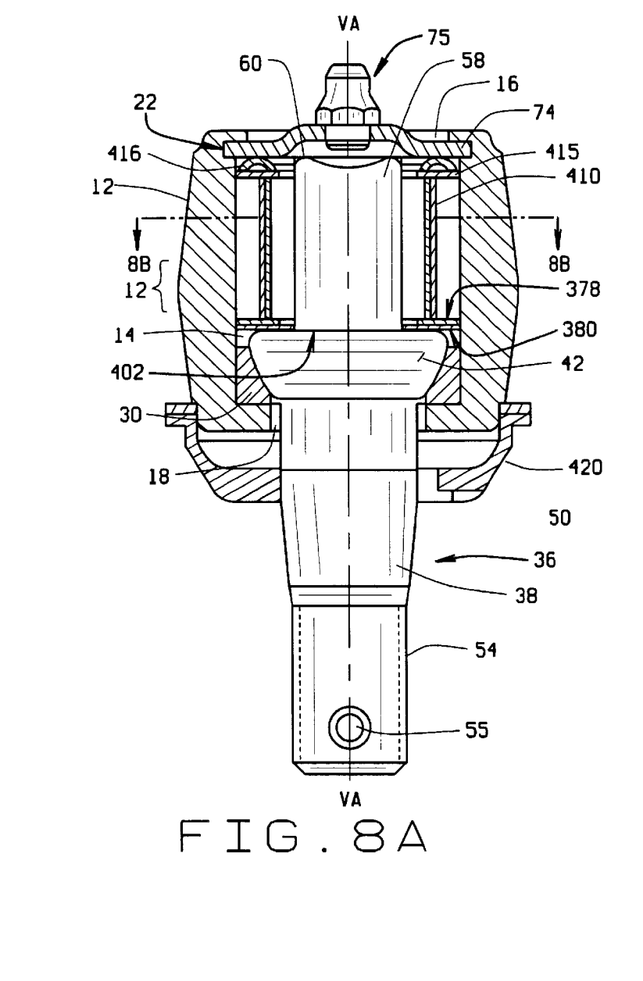
FIG. 8A is a section view of an alternate embodiment of the preloaded pivot socket of the present invention, illustrating a crinkled coil of spring steel as a compliance bearing resilient member.
Figure 8B:
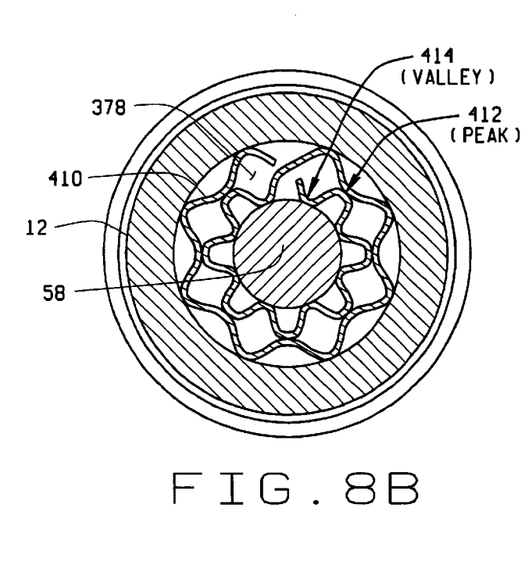
FIG. 8B is a top-down cross sectional view of the alternate embodiment of the preloaded pivot socket of FIG. 8A, illustrating the arrangement of the crinkled coil of spring steel.

Turning specifically to FIGS. 8A and 8B, a sixth alternative embodiment of the present invention pivot joint is shown wherein elastomeric cushion 68 is replaced with a resilient member comprising a corrugated or crinkled coil compliance bearing 410 formed from sheet steel. Crinkled coil compliance bearing 410 includes a number of radially orientated peaks 412 and valleys 414, and is spiral wound about axial stud 58 such that each peak 412 on a first portion of spiral wound crinkled coil compliance bearing 410 is radially aligned, and in contact with, a valley 414 on a second portion of spiral wound crinkled coil compliance bearing 410. Those skilled in the art will recognize that alternative windings of crinkled coil compliance bearing 410 are possible, and may include the use of two or more concentric rings (not shown) of crinkled coil compliance bearings arranged such that peaks 412 on a first ring are radially aligned, and in contact with, a valley 414 on a second ring. Seated between crinkled coil compliance bearing 410 and flat radial surface 402 is Belleville washer 378 and first flat washer 380. During installation, Belleville washer 378 is seated against flat radial surface 402. Next, first flat washer 380 is placed on Belleville washer 378, and crinkled coil compliance bearing 410 seated edge-wise on the upper surface of first flat washer 380. A second flat washer 415 is positioned on the upper edge of crinkled coil compliance bearing 410, and a telescoping ring 416 is seated thereon. Finally, end closure cap 74 is installed within circumferential groove 22. The installation of end closure cap 74 deforms Belleville washer 378 and crushes portions of telescoping ring 416, such that the Belleville washer exerts a preload force on flat radial surface 402, stud 36, and lower bearing 30. Also shown in FIG. 8A is a dust cover 420 secured to the lower portion of the housing, surrounding stud 36. Dust cover 420 may be constructed from any flexible material to provide a protective enclosure for stud 36 and lower portion of the housing.

As with elastomeric cushion 68, crinkled coil compliance bearing 410 is configured to transfer axial loads resulting from axial or lateral forces on stud 36 upward to end closure cap 74 from upper bearing 62. These axial loads are transferred from flat radial surface 406 through Belleville washer 378 and first flat washer 380 to crinkled coil compliance bearing 410 and up to end closure cap 74 through second flat washer 415 and telescoping ring 416. The contacting peaks 412 of crinkled coil compliance bearing 410 resist any radial forces resulting from angulation forces on the stud 36 by resiliently deforming. Lateral loads on stud 36 are transformed into a axial forces by the interaction of lower bearing 30 and stud 36, and are transferred to end closure cap 74 through crinkled coil compliance bearing 410. Those skilled in the art will recognize that a variety of materials may be utilized to form crinkled coil compliance bearing 410 within the scope of the present invention. For example, the resilience of the sheet steel may be varied depending upon the particular application for which pivot joint 10 is designed. Alternatively, the number of peaks 412 and valleys 414, as well as number of spiral windings of crinkled coil compliance bearing 410 may be varied to absorb radial forces directly from pin portion 58.

Figure 9:
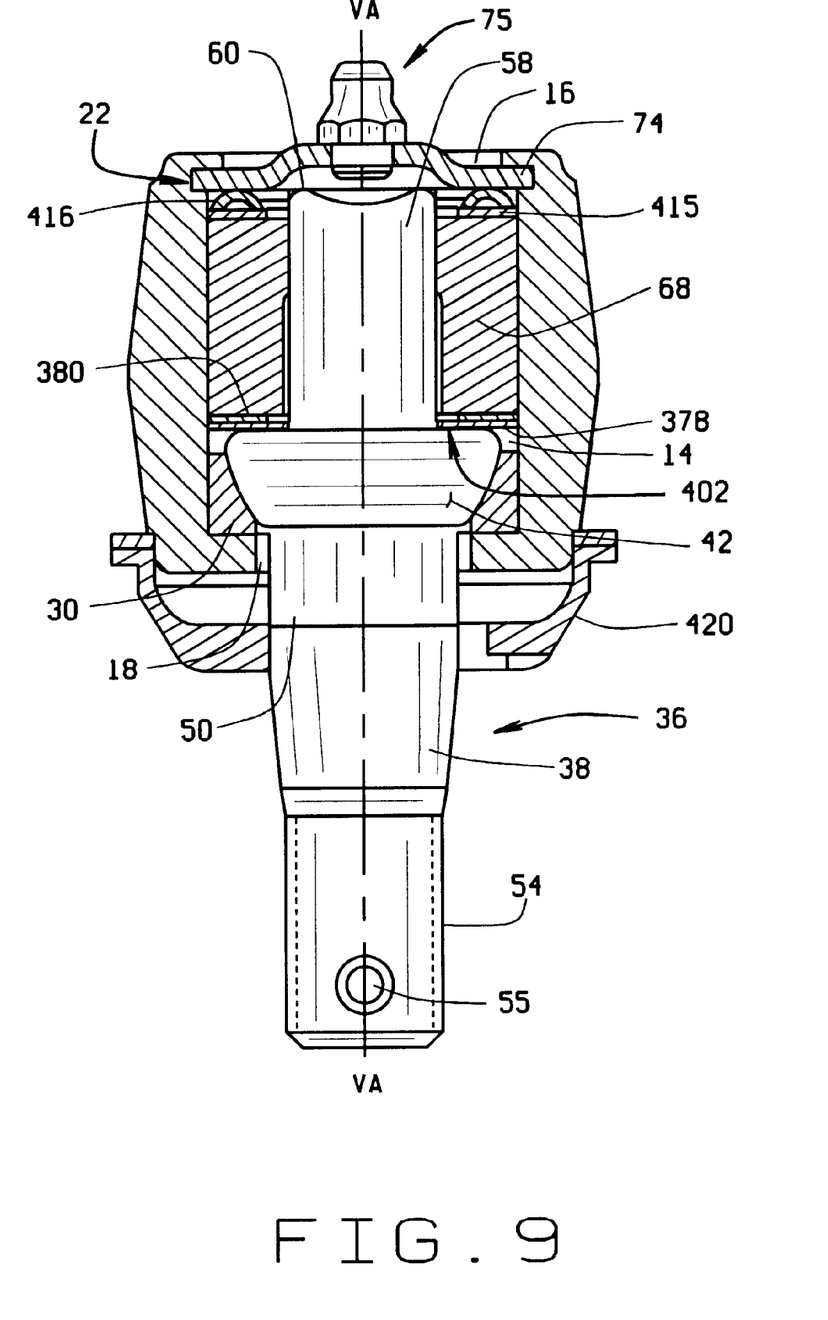
FIG. 9 is a sectional view of a second embodiment of the preloaded pivot socket of the present invention, illustrating an elastomeric cushion resilient member.
Figure 10:
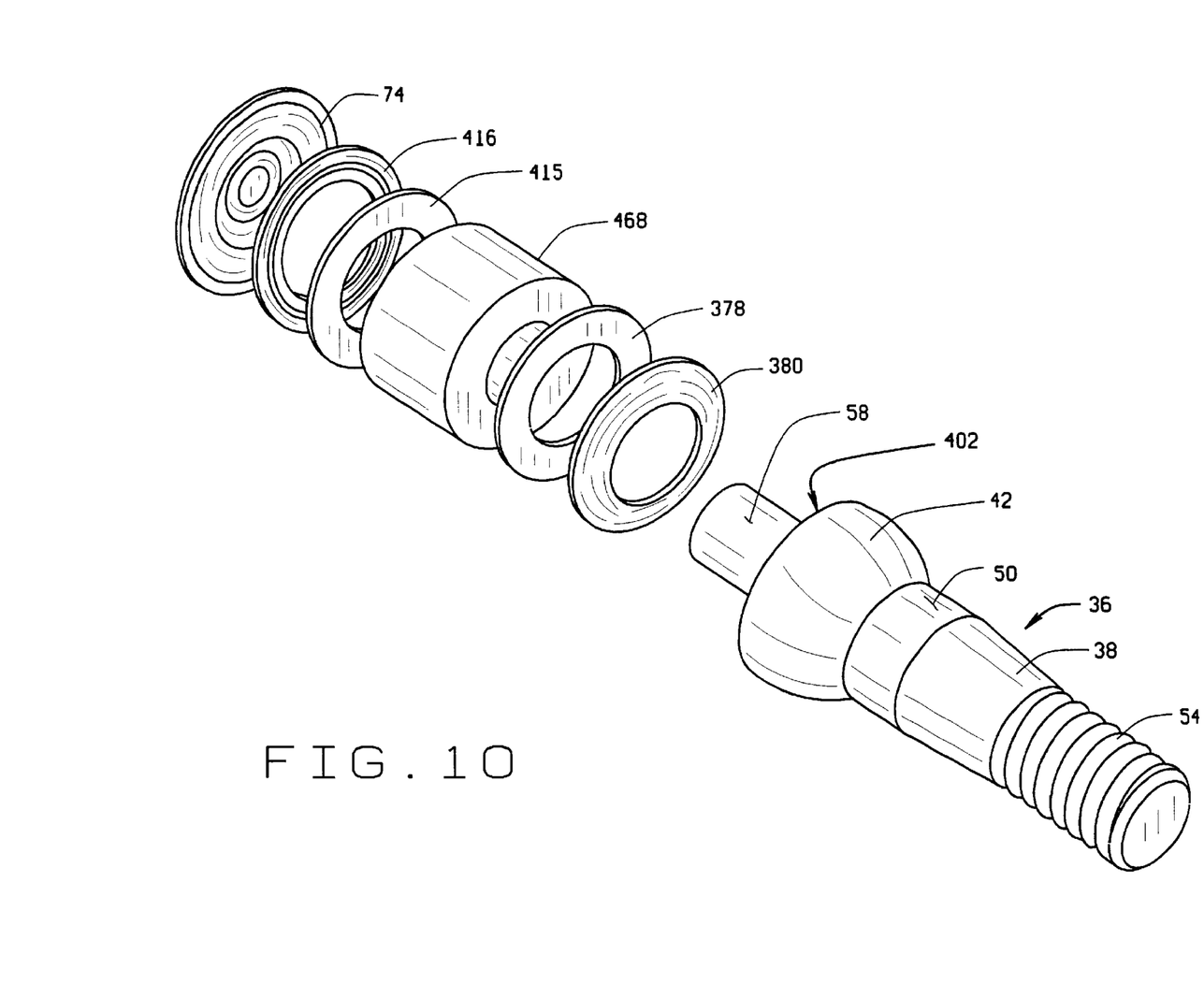
FIG. 10 is a perspective exploded view of the preloaded pivot socket of FIG. 9.

Turning specifically to FIGS. 9 and 10, a seventh alternative embodiment of the present invention pivot joint is shown wherein a resilient member comprising an elongated elastomeric cushion 468 rests on the upper surface of first flat washer 380. Elongated elastomeric cushion 468 surrounds the length of the cylindrical axial extension or pin portion 58, and is secured between the inner surface of the housing defining central bore 14 and the exterior surface of pin portion 58 by an interference fit. As with elastomeric cushion 68, elongated elastomeric cushion 468 is configured to transfer axial forces resulting from axial or lateral loads on stud 36 upward to end closure cap 74 from flat radial surface 406, however, the greater surface area of the elongated elastomeric cushion 468 permits the transfer of greater loads without permanent deformation or damage. These axial loads are transferred from flat radial surface 406 through Belleville washer 378 and first flat washer 380 to elongated elastomeric cushion 468 and up to end closure cap 74 through second flat washer 415 and telescoping ring 416. Elongated elastomeric cushion 468 additionally resists any radial forces resulting from angulation forces on stud 36 by resiliently deforming, allowing only minor freedom of movement of stud 36. Those skilled in the art will recognize that a variety of materials may be utilized to form elongated elastomeric cushion 468 within the scope of the present invention.

In view of the above, it will be seen that the several objects of the invention are achieved and other advantageous results are obtained. Several embodiments are shown wherein the internal components of a pivot joint surrounding a partially spherical head portion of the stud transfer lateral and axial forces exerted on the stud axially to the end closure cap of the housing through internal components other than the stud itself. Simultaneously, these internal components are capable of providing a radial resistance to angulation forces applied to the stud and transferred to the components through a pin projection on the upper end of the stud within the housing. As various changes could be made in the above constructions without departing from the scope of the invention, it is intended that all matter contained in the above description or shown in the accompanying drawings shall be interpreted as illustrative and not in a limiting sense.

What is claimed is:

1. A preloaded pivot joint assembly comprising:

a housing having an axis;

a stud having a lower part-spherical head portion and a flat radial upper surface retained within the housing, a shaft portion projecting axially from the housing, and an elongated cylindrical pin portion projecting axially from said flat radial upper surface within the housing;

a bearing having part-spherical bearing surface, said bearing retained within the housing, said bearing surface enclosing a portion of said lower part-spherical head portion; and a resilient member disposed within said housing, said resilient member biasing against said flat radial upper surface of said stud to accommodate axial forces therefrom, said resilient member further biasing against said elongated cylindrical pin portion to accommodate radial forces therefrom; and an annular preload member disposed between said resilient member and said biased flat radial surface of said stud.

2. A preloaded pivot joint assembly comprising:

a housing having an axis and a surface defining a bore about said axis;

a cap secured to said housing, said cap configured to enclose one end of said bore;

a stud having a lower part-spherical head portion and a flat radial upper surface retained within the housing bore, a shaft portion projecting axially from said housing opposite said cap, and an elongated cylindrical pin portion projecting axially from said flat radial upper surface within said housing bore, said elongated cylindrical pin portion in spaced relationship to said housing surface and said cap;

a bearing having part-spherical bearing surface, said bearing retained within the housing bore, said bearing surface enclosing a portion of said lower part-spherical head portion;

a cylindrical resilient member disposed about said elongated cylindrical pin portion, said cylindrical resilient member adapted to transfer axial loads from said flat radial upper surface of said stud to said cap, and to transfer radial loads from said elongated cylindrical pin portion to said housing surface; and at least one annular preload member disposed between said cylindrical resilient member and said flat radial surface of said stud.

3. A preloaded pivot joint assembly comprising:

a housing having an axis and a surface defining a bore about said axis;

a cap secured to said housing, said cap configured to enclose one end of said bore;

a stud having a lower part-spherical head portion and a flat radial upper surface retained within the housing bore, a shaft portion projecting axially from said housing opposite said cap, and an elongated cylindrical pin portion projecting axially from said flat radial upper surface within said housing bore, said elongated cylindrical pin portion in spaced relationship to said housing surface and said cap;

a bearing having part-spherical bearing surface, said bearing retained within the housing bore, said bearing surface enclosing a portion of said lower part-spherical head portion;

a cylindrical resilient member disposed about said elongated cylindrical pin portion, said cylindrical resilient member adapted to transfer axial loads from said flat radial upper surface of said stud to said cap, and to transfer radial loads from said elongated cylindrical pin portion to said housing surface; and one or more annular spacer members disposed between said cylindrical resilient member and said flat radial surface of said stud.

4. A preloaded pivot joint assembly comprising:

a housing having an axis and a surface defining a bore about said axis;

a cap secured to said housing, said cap configured to enclose one end of said bore;

a stud having a lower part-spherical head portion and a flat radial upper surface retained within the housing bore, a shaft portion projecting axially from said housing opposite said cap, and an elongated cylindrical pin portion projecting axially from said flat radial upper surface within said housing bore, said elongated cylindrical pin portion in spaced relationship to said housing surface and said cap;

a bearing having part-spherical bearing surface, said bearing retained within the housing bore, said bearing surface enclosing a portion of said lower part-spherical head portion;

a cylindrical resilient member disposed about said elongated cylindrical pin portion, said cylindrical resilient member adapted to transfer axial loads from said flat radial upper surface of said stud to said cap, and to transfer radial loads from said elongated cylindrical pin portion to said housing surface; and one or more annular spacer members disposed between said cylindrical resilient member and said cap.

* * * * *

UNITED STATES PATENT AND TRADEMARK OFFICE
CERTIFICATE OF CORRECTION

PATENT NO. : 6,413,003 B1 Page 1 of 1
DATED : July 2, 2002
INVENTOR(S) : George R. Schmidt, Glen C. Parker, Roger Sellers and June M. Jeffries It is certified that error appears in the above-identified patent and that said Letters Patent is hereby corrected as shown below:

<u>Title page,</u>
Item [73], the Assignee is listed as "Federal-Mogul Worle Wide, Inc.", it should read
-- Federal-Mogul World Wide, Inc. --

Signed and Sealed this

Twenty-ninth Day of October, 2002

*Attest:*

JAMES E. ROGAN
*Attesting Officer*  *Director of the United States Patent and Trademark Office*